Dec. 2, 1969   K. ERDMANN ET AL   3,481,255
PISTON FOR HIGH-PRESSURE COMPRESSORS
Filed April 21, 1967   3 Sheets-Sheet 1

INVENTORS:
KURT ERDMANN (by Lydia Nerlich)
CLAUS FISCHER
HEINRICH FRIEDENREICH
HELMUT BAUER BY: Marzall, Johnston, Cooks Root
ATT'YS Dec. 2, 1969     K. ERDMANN ET AL     3,481,255
PISTON FOR HIGH-PRESSURE COMPRESSORS
Filed April 21, 1967     3 Sheets-Sheet 2
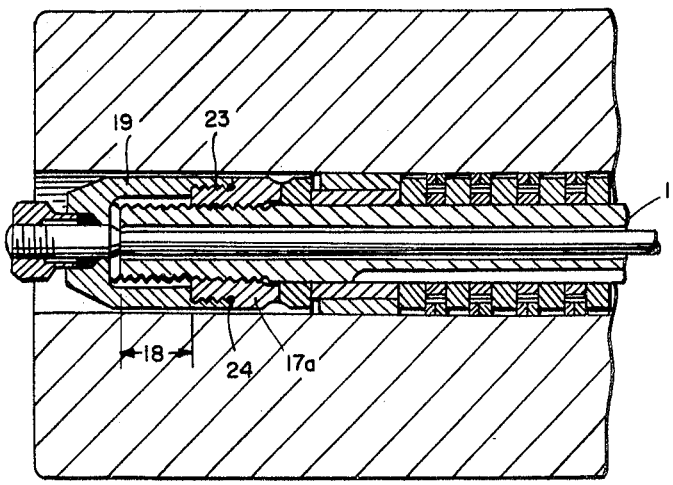
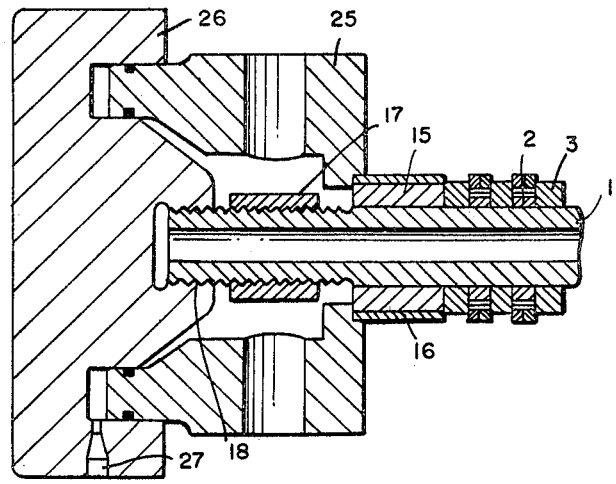
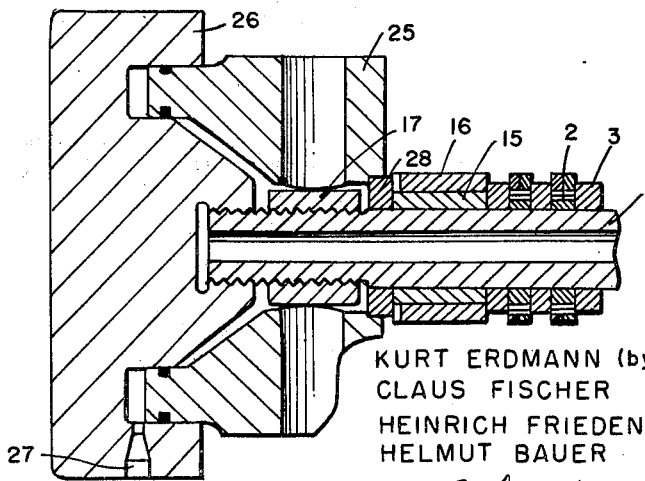
INVENTORS:
KURT ERDMANN (by Lydia Nerlich)
CLAUS FISCHER
HEINRICH FRIEDENREICH
HELMUT BAUER

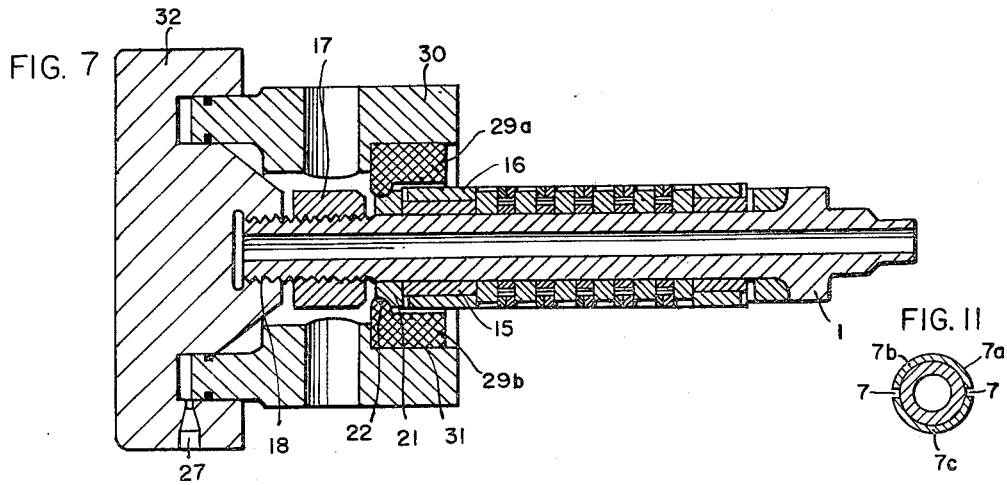
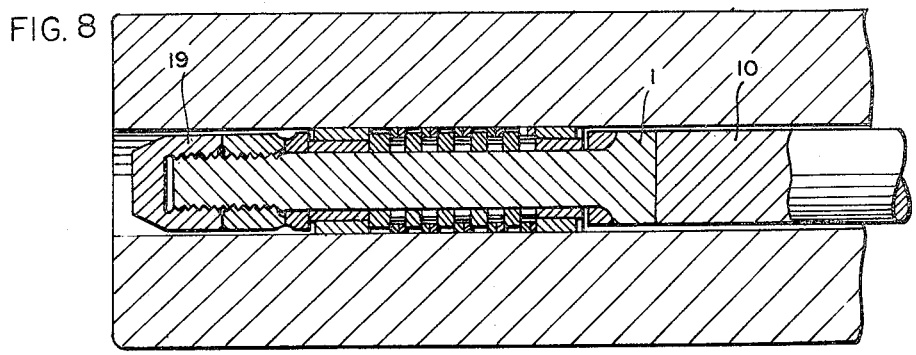
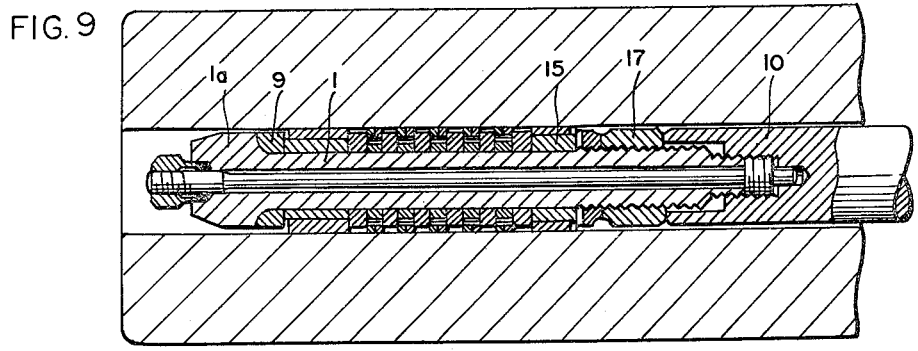
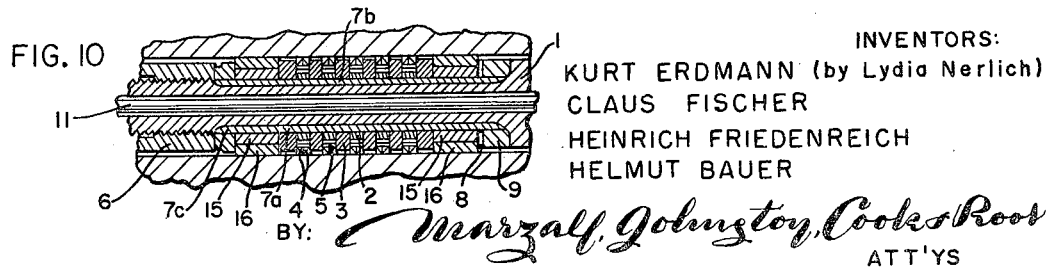

# United States Patent Office 3,481,255
Patented Dec. 2, 1969

3,481,255
PISTON FOR HIGH-PRESSURE COMPRESSORS
Kurt Erdmann, Wesseling, by Lydia Nerlich, curatrix, Claus Fischer, Ludwigshafen (Rhine), and Heinrich Friedenreich, Limburgerhof, Pfalz, Germany, and Helmut Bauer, Basel, Switzerland, assignors to Badische Anilin- & Soda-Fabrik Aktiengesellschaft, Ludwigshafen (Rhine), Germany
Filed Apr. 21, 1967, Ser. No. 642,618
Claims priority, application Germany, Apr. 23, 1966, 1,284,760
Int. Cl. F16j 1/00; F02f 3/00
U.S. Cl. 92—258                                    6 Claims

ABSTRACT OF THE DISCLOSURE

A piston for high-pressure compressors which consists of a plurality of rings forced together coaxially on a sleeve. The sleeve is located on a central anchor which serves to transmit the axial forces.

BACKGROUND OF THE INVENTION

This invention relates to a piston for high-pressure compressors.

As a rule, the gap between the piston and the cylinder wall in compressors is sealed by means of split piston rings which fit in annular grooves. The number of piston rings to be placed on the skirt of the piston is determined by the maximum pressure difference between the suction and pressure sides. In order to reduce gas losses by leakage at high and extreme pressure differences, piston rings of special design at the point of junction of the overlap or pairs of piston rings whose joints are offset in relation to each other have to be used. Often these rings have to be installed in the annular groove together with a leaf spring, which is placed behind the piston ring to increase the pressure of the piston ring against the cylinder wall. At differential pressures of more than 1000 atmospheres, piston ring seals of conventional design do not last very long, because the grooves in the piston skirt deform, with the result that after a certain period of time the piston rings in them are no longer exactly positioned. They then deform increasingly with each stroke, are more severely stressed, are subjected to greater wear, and finally fracture. A known method of overcoming such defects or disadvantages in the case of high differences between the suction and final pressures of a compressor stage is to construct the pistons from a number of elements. Underneath the piston rings there are base rings and beside the piston rings there are intermediate rings, which are arranged on a common piston rod. It is also known to combine adjacent base and intermediate rings to form a common ring with an L-shaped cross-section without altering the basic principle of the multi-element structure. The advantages of a piston made up in this manner are that both bearing surfaces for the piston ring can be face-ground with machine tools and that the piston rings need not be bent apart with great force, even during assembly. When a certain diameter is exceeded, the latter procedure leads to permanent deformation of the piston rings. It is also known that in the case of differental pressures of more than 1000 atmospheres the elements of a piston composed in this manner should not be made of steel or cast iron but of a cemented carbide. Cemented carbides hardly alter their shape during running of the machine and thus offer the piston ring a good bearing surface over an appreciably longer running time.

Composite pistons of known construction consist essentially of a piston rod with a thread at the end, the various rings placed thereon, the piston rings, and a nut which is screwed on the thread of the piston rod and which holds all parts under a certain stress. During the compression stroke, a pulsating load is imposed as a result of the difference in pressure between the suction and exhaust sides that exists in the cylinder and acts on the face of the piston. Moreover, the chambers between the individual piston rings are filled with the compressed medium as a result of slight leaks. The pressure in these chambers is then higher than the suction pressure in the cylinder, so that a tensile force is exerted on the thread of the piston rod during the suction stroke. As a result, this thread is subjected to an additional pulsating load when the machine is running.

Thus, for pressure differences of more than 500 atmospheres it has proved advisable to force the composite piston together by means of a necked-down bolt led through a hollow piston rod. In this design, however, the whole piston rod has to be removed in order to loosen the necked-down bolt in changing the piston rings.

In the case of still higher differential pressures, i.e., about 1000 atmospheres, between the suction and the final pressures of the one stage, difficulties are encountered regarding the dimensions of the necked-down bolt. The pulsating load on its thread would then be so great that the necessary size of thread could no longer be accommodated in the space available.

It is an object of the invention to provide a piston for extreme pressure differences which consists of rings forced against each other, whose piston rings are readily replaceable, and which has sufficient cross-sectional area for accommodating the tightening element. Another object of the invention is to provide a piston which allows gas that has leaked through the piston rings to collect in special chambers and to be removed at suitable points. Yet another object of the invention is to provide a composite piston which makes it possible to use hydraulic tightening devices for forcing the rings together irrespective of the dimensions of the rings.

These objects are achieved according to the invention by arranging the intermediate rings, the base rings, the piston rings, and any required spacers concentrically on a sleeve which in its turn is mounted on an anchor. Thus, the anchor sleeve, the various elements arranged on it and the tightening nut form the piston.

Another feature of the invention is that the anchor sleeve has a polygonal, preferably a triangular, cross-section. In this case, channels for removing the leakage gas are formed between the surfaces of the prismatic anchor sleeve and the internal surfaces of the intermediate and base rings. The anchor sleeve may however also have a circular cross-section. In this case, an intermediate sleeve is arranged between the anchor sleeve and the individual elements mounted on it. This intermediate sleeve should preferably be made of a softer material than that of the anchor sleeve and contain the channels for removing the leakage gas. The advantage of this arrangement is that the individual elements do not exert any pressure on the anchor sleeve when they deform elastically under the pulsating gas pressure. The composite piston consisting of the anchor sleeve and all the rings is detachably connected to the piston rod by means of the anchor passed through the anchor sleeve. The anchor is best connected to the piston rod by means of a structure as described in U.S. patent application Ser. No. 392,530 filed Aug. 27, 1964, and now U.S. Patent No. 3,350,119.

The piston is described in detail below with reference to the accompanying drawings representing several embodiments of the invention.

DESCRIPTION OF THE DRAWINGS

In the drawings:

FIGURES 2, 3 and 4 are fragmentary, longitudinal sectional views, similar to FIGURE 1, showing respective modified forms of the present invention;

FIGURES 5 and 6 are fragmentary, somewhat diagrammatic views illustrating mechanism for prestressing pistons embodying the principle of the present invention;

FIGURE 10 is a fragmentary, longitudinal sectional view, similar to FIGURE 1, showing a modified form of the present invention; and FIGURE 11 is detail, transverse sectional view through the anchor sleeve as shown in FIGURE 10.

DESCRIPTION OF THE EMBODIMENTS SHOWN HEREIN

Figure 1:
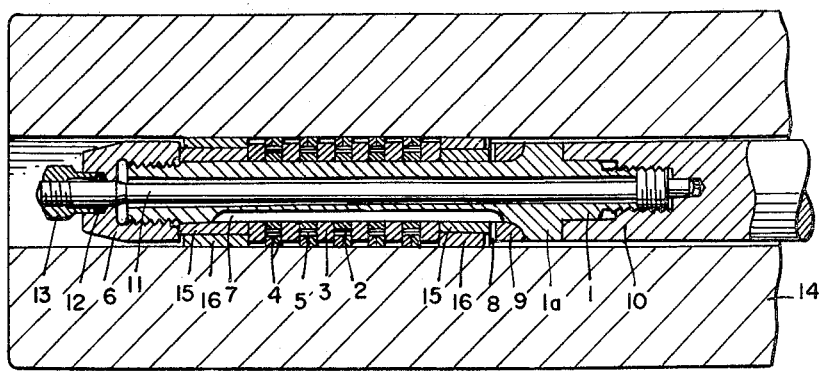
FIGURE 1 is a longitudinal sectional view through a piston embodying the principles of the present invention, and showing the piston mounted in a cylinder.
Figure 1A:
FIGURE 1a is a detail, cross sectional view through the anchor sleeve of the piston shown in FIGURE 1.

As can be seen in FIG. 1, the composite piston consists of a central anchor sleeve 1, on which there are alternately arranged base rings 2 and intermediate rings 3. The piston rings 4 or pairs of piston rings, behind which there are preferably arranged tension springs 5, lie above the base rings 2. The whole set of rings is forced against the back end 1a of the anchor sleeve by means of the tightening nut 6. The cross-section of the anchor sleeve 1 should be so designed that it allows the base rings 2 and intermediate rings 3 to be guided satisfactorily and that one or more channels 7 are formed between the anchor sleeve and the rings 2 and 3 for the removal of any gas that has accumulated as a result of leakage at the rings. This requirement is met for example by rounded polygonyl cross-sections. For the axial section of the anchor sleeve 1 carrying the rings 2 and 3, a triangular cross-section, for example, has given good results (see FIG. 1a). The wall thickness of the tightening nut 6 is such that it can be subjected to the full operating pressure from the face of the piston when the internal pressure is zero. The anchor sleeve 1 and the tightening nut 6 are provided with a central hole, through which the anchor 11 is led. The anchor sleeve 1 is attached to the piston rod 10 by means of anchor 11. The gasket 12 and the nut 13 provide a seal between the anchor 11 and the tightening nut 6.

For guiding the set of rings in the cylinder 14, one or two spaces 15 are provided on the anchor sleeve. The spacers in their turn carry guide sleeves 16. Each spacer 15 should preferably be made of the same material as the base and intermediate rings 2 and 3, e.g., of steel or a cemented carbide. For the guide sleeves 16 a material that glides smoothly over the surface of the cylinder should be selected, preferably bronze or cast iron. Furthermore, either the guide sleeves 16 or the spacers 15 should be provided with channels in the form of grooves or holes. The leakage gas passing through the piston rings 4 should be able to stream through these channels without subjecting the guide sleeves to a differential pressure. The base and intermediate rings 2 and 3 form a gas-tight fit with one another and with the tightening nut 6. As a result, the space between the anchor sleeve 1, the base rings 2, the intermediate rings 3, the spacers 15, and the tightening nut 6 can be kept free from pressure. This space is connected to the space around the piston rod 10 by means of the channels 7 on the anchor sleeve 1 and by radial grooves 8 in the washer 9. The space around the piston rod 10 is connected to the atmosphere or to a line for removal of the leakage gas. In order to effect a complete seal between the individual rings 2, 3, and 15, gaskets may be inserted, but these are not shown in FIG. 1.

Figure 2:
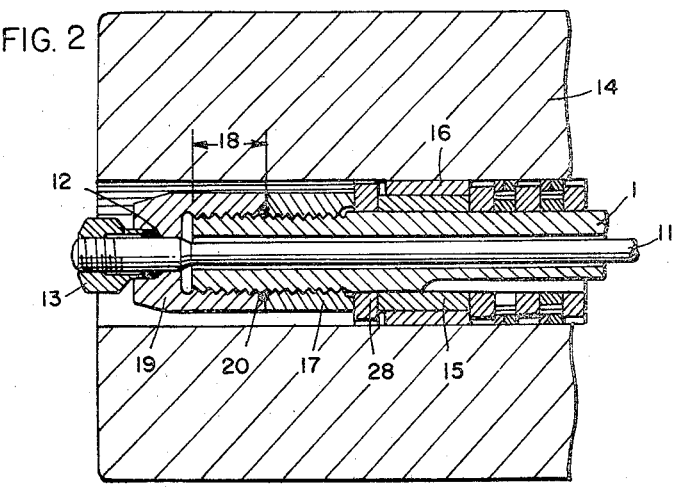
Figure 3:
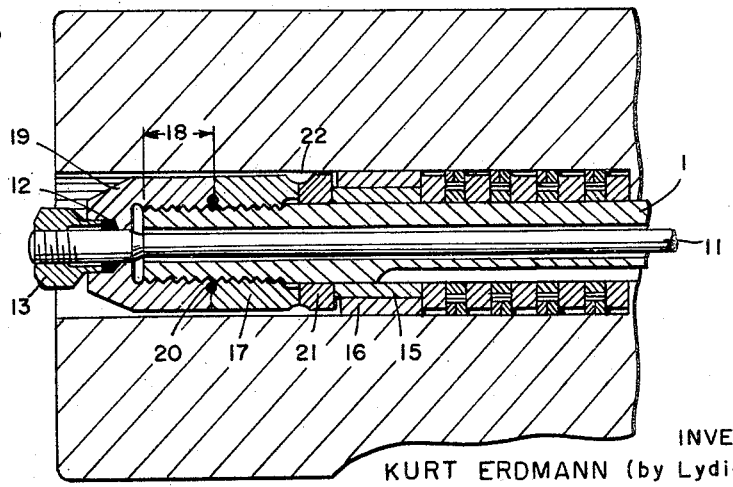

The gastight fit of the rings forming the composite piston requires the application of adequate pressure, for which purpose the anchor sleeve 1 must be tensioned with a sufficiently large force. In the simplest case this can be applied by tightening the nut 6. Since, however, the required force is so large that it is difficult to apply mechanically, it is advisable to apply it hydraulically during the assembly of the piston. An embodiment of the piston according to the invention which is suitable for this purpose is shown in FIG. 2. Parts 1 to 5 and 7 to 16 in this embodiment are the same as those in the composite piston shown in FIG. 1. However, in this case, the tightening nut is an open nut 17 and not a cap nut. The thread of the anchor sleeve 1 is extended. To tighten the composite piston, a hydraulic tensioning device, details of which are given in FIGS. 5 to 7, is screwed onto the additional length 18 of the thread. After the force has been applied, a nut 19 is placed on the same section of the thread. This nut 19 has a hole to accommodate the anchor 11 and the seal 12. The nut 13 which is screwed onto the anchor enters the outer end of the hole in the nut. If the outer diameter of the tightening nut 17 exceeds a certain size, a ring 20 (FIG. 2) or a locking ring 21 (FIG. 3) has to be inserted between the tightening nut 17 and the spacer 15. This is described in detail below.

The tightening nut 17 and the nut 19 are tightened against one another until a gastight fit is obtained. In order to avoid the additional stress thus produced in the thread of the anchor sleeve 1, a sealing ring 20 may be inserted or another suitable seal may be provided. Furthermore, the nut 19 may be screwed onto a thread 23 that is provided on the circumference of the tightening nut 17a (cf. FIG. 4) instead of onto the extended thread 18 of the anchor sleeve. In this case a seal 24 has to be inserted between the nut 19 and the tightening nut 17a.

If the outer diameter of the tightening nut 17 is sufficiently smaller than the inner diameter of the cylinder 14, a hydraulic tensioning device of known design according to FIG. 5 may be screwed onto the extended thread 18 of the anchor sleeve 1 and supported against the spacer 15. The tensioning device then exerts a tensile force on the anchor sleeve 1, on the one hand, and a compressive force on the base and intermediate rings and spacers 2, 3 and 15, on the other hand.

FIG. 5 shows a hydraulic tensioning device of this type. It consists of a ring-shaped piston 25, which lies against the spacer 15, and the corresponding cylinder 26, the inside of which is screwed onto the extended thread of the anchor 1. The anchor 1 is tensioned by pumping oil into the opening 27 on the cylinder 26, while the base and intermediate rings and spacers 2, 3 and 15 arranged on the anchor are compressed. After application of the oil pressure corresponding to the calculated force, the tightening nut 17 is screwed against the spacer 15. The oil pressure is released, the tensioning device with parts 25 and 26 is removed, and the cap nut 19 with seal 20 is screwed on. The composite piston is then ready for connection to the piston rod.

If the difference in diameter between the tightening nut 17 and the cylinder 14 of the compressor is smaller, a ring 28 as shown in FIG. 6 must be inserted between the tightening nut 17 and the spacer 15. During prestressing, the piston 25 of the tensioning device lies against this ring 28 and thus does not press on the guide sleeve 16.

If the difference in diameter between the tightening nut 17 and the compressor cylinder 14 is so small that it is not possible to use a tensioning device, a locking ring 21 with an annular recess 22 can be placed on the anchor sleeve 1 between the tightening nut and the spacer 15. Thereupon a tensioning device as shown in FIG. 7 may be fitted. This consists essentially of the two-piece pressure ring 29a–29b, a cylinder 30 for accommodating the fluid for applying the pressure, and the hydraulic piston 32. The pressure ring 29a–29b is inserted in the annular recess 22 of the locking ring 21 and may lie against the bearing surface of the guide sleeve 16. The cylinder 30 lies against the two-piece ring 29a–29b and retains it in the cavity 31. The hydraulic piston 32 is screwed onto the extended thread 18 of the anchor sleeve 1.

If the final pressure in the compression chamber of the compressor is sufficiently high, the force exerted by the gas on the face of the composite piston is so large that there is no need to secure the composite piston onto the piston rod 10 by means of anchor 11. In this case the nuts 6 and 19 and the anchor sleeve 1 do not have an axial hole. The surface of the anchor sleeve 1 which is in contact with the piston rod 10 can then be of any desired shape—either completely flat as is shown in FIG. 8 or spherical. Before the machine is started up, there must be a certain initial pressure in the compression chamber in order to ensure that the composite piston and the piston rod do not strike one another.

Finally, the composite piston can be so designed that the tightening nut 17 is at the end facing the piston rod. Such an embodiment is shown in FIG. 9. The function of the individual elements is otherwise the same as in the other arrangements described.

FIGS. 10 and 11 show a modified embodiment of sleeve 1, wherein it is of round cross section throughout its length, and with an intermediate sleeve 7a for supporting rings 2, 3 and 15, and for forming channels 7. The sleeve 7a, it will be remembered, is preferably of softer material than the sleeve 1, and embodies two sections 7b and 7c having a circumference less than 180° so as to afford the channels 7 therebetween, FIG. 11.

We claim:

1. A piston for high-pressure compressors, comprising
 (a) an elongated piston rod,
 (b) an elongated anchor projecting from one end of said rod in axial alignment therewith,
 (c) an anchor sleeve mounted on said anchor,
 (d) a plurality of rings mounted on said sleeve in concentric relation thereto,
 (e) said rings comprising,
   (1) intermediate rings spaced from each other along said sleeve,
   (2) base rings disposed between respective pairs of said intermediate rings, and
   (3) piston rings mounted on respective ones of said base rings in concentric relation thereto, and
 (f) means for keeping said rings under compressive stress,
 (g) said means comprising,
   (1) abutment means on one end of said sleeve, and
   (2) closed nut means threaded onto the periphery of said sleeve,
     (a′) clamping said rings against said abutment means, and
     (b′) sealing off the interior of said sleeve at said one end.

2. A piston as defined in claim 1, and in which
 (a) said nut means includes,
   (1) a nut having an opening therethrough through which said anchor extends, and
   (2) means sealingly closing said opening.

3. A piston as defined in claim 1, and in which
 (a) said nut means includes,
   (1) a nut having an opening therethrough through which said anchor extends, and
   (2) means, including another nut engaged with said first mentioned nut, for sealingly closing said opening.

4. A piston as defined in claim 1, and in which
 (a) said nut means includes,
   (1) a nut having an opening therethrough through which said anchor extends, and
   (2) means, including another nut threaded onto said anchor and extending into said opening, for sealingly closing said opening.

5. A piston for high-pressure compressors, comprising
 (a) an elongated piston rod,
 (b) an elongated anchor projecting from one end of said rod in axial alignment therewith,
 (c) an anchor sleeve mounted on said anchor
 (d) a plurality of rings mounted on said sleeve in concentric relation thereto,
 (e) said rings comprising
   (1) intermediate rings spaced from each other along said sleeve,
   (2) base rings disposed between respective pairs of said intermediate rings, and
   (3) piston rings mounted on respective ones of said base rings in concentric relation thereto, and
 (f) means for keeping said rings under compressive stress,
 (g) said means comprising
   (1) abutment means on one end of said sleeve, and
   (2) closed nut means threaded onto the periphery of said sleeve,
     (a′) clamping said rings against said abutment means, and
     (b′) sealing off the interior of said sleeve at said one end,
 (h) said anchor sleeve having a polygonal outside cross-section to afford channels between the outer surface of said sleeve and the inner surfaces of said intermediate and base rings, and
 (i) radial grooves extending outwardly from said channels to outside said rod at the end of said sleeve remote from said nut means.

and

6. A piston for high-pressure compressors, comprising
 (a) an elongated piston rod,
 (b) an elongated anchor projecting from one end of said rod in axial alignment therewith,
 (c) an anchor sleeve mounted on said anchor
 (d) a plurality of rings mounted on said sleeve in concentric relation thereto,
 (e) said rings comprising
   (1) intermediate rings spaced from each other along said sleeve,
   (2) base rings disposed between respective pairs of said intermediate rings, and
   (3) piston rings mounted on respective ones of said base rings in concentric relation thereto, and
 (f) means for keeping said rings under compressive stress,
 (g) said means comprising
   (1) abutment means on one end of said sleeve, and
   (2) closed nut means threaded onto the periphery of said sleeve,
     (a′) clamping said rings against said abutment means, and
     (b′) sealing off the interior of said sleeve at said one end,
 (h) said anchor sleeve having a round outside cross-section, and
 (i) another sleeve being mounted on said anchor sleeve between the outer surface of said anchor sleeve and the inner surface of said intermediate and base rings,
 (j) said other sleeve
   (1) comprising softer material than said anchor sleeve, and
   (2) having channels for leading off leakage gas.

(References on following page)

References Cited

UNITED STATES PATENTS

| | | | |
|---|---|---|---|
| 1,881,269 | 10/1932 | Evans et al. | 277—110 X |
| 1,917,639 | 7/1933 | Evans | 92—251 X |
| 2,295,521 | 9/1942 | Payne et al. | 92—258 X |
| 2,413,347 | 12/1946 | Hamilton et al. | 92—258 X |
| 2,793,089 | 5/1957 | Anderson | 92—257 |
| 2,950,153 | 8/1960 | Esmay | 92—250 |
| 3,155,014 | 11/1964 | Genz | 92—254 X |
| 3,165,032 | 1/1965 | Konkle | 92—252 |
| 3,350,119 | 10/1967 | Friedenreich et al. | 287—53 |
| 3,353,456 | 11/1967 | Bauer | 92—258 |

FOREIGN PATENTS

| | | |
|---|---|---|
| 1,026,142 | 3/1958 | Germany. |
| 1,108,231 | 1/1956 | France. |

CARROLL B. DORITY, JR., Primary Examiner